UNITED STATES PATENT OFFICE.

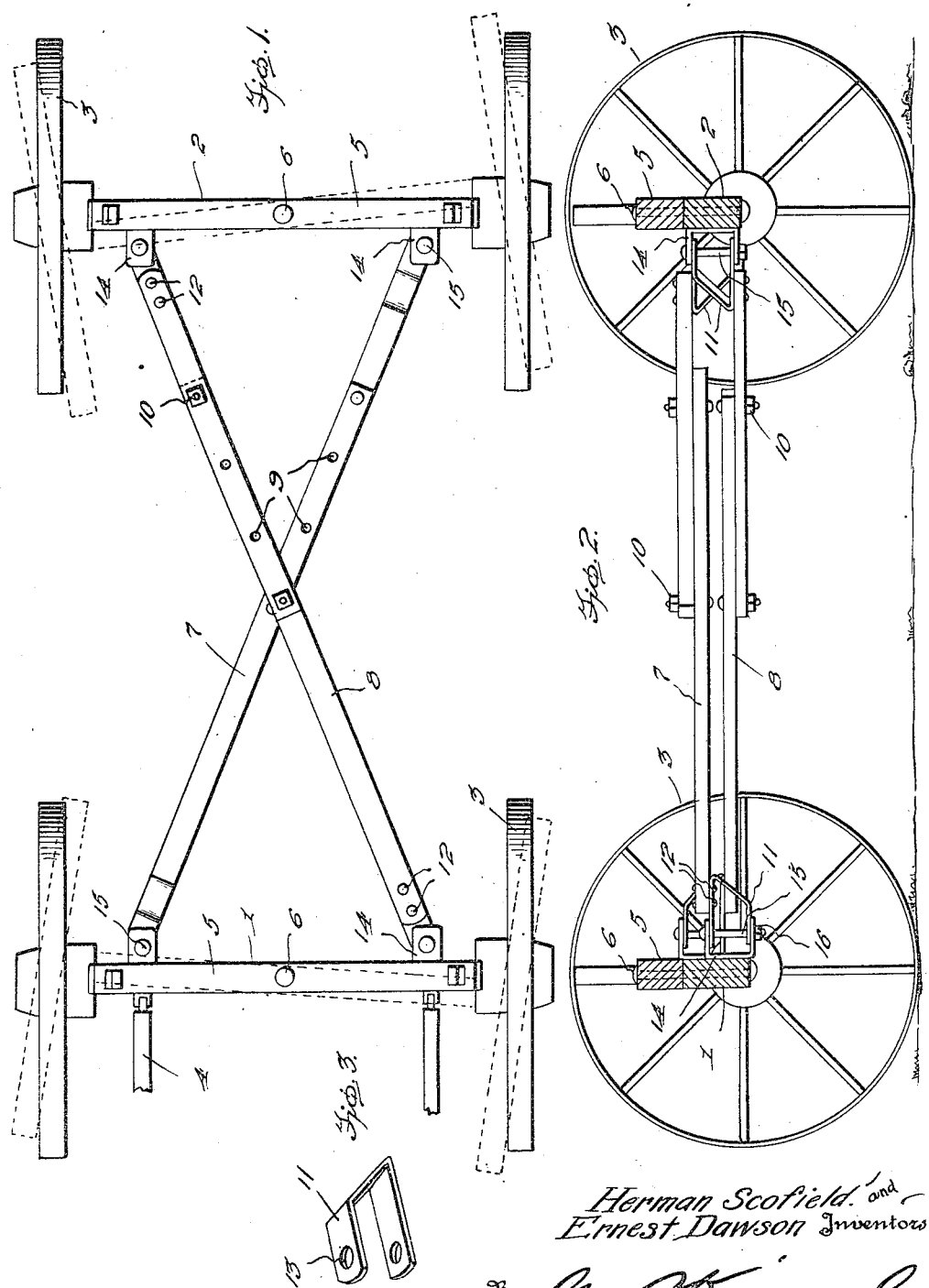

HERMAN SCOFIELD AND ERNEST N. DAWSON, OF SYRACUSE, NEW YORK.

VEHICLE RUNNING-GEAR.

1,267,467.

Specification of Letters Patent.  Patented May 28, 1918.

Application filed January 24, 1917.  Serial No. 144,195.

*To all whom it may concern:*

Be it known that we, HERMAN SCOFIELD and ERNEST N. DAWSON, citizens of the United States, and residents of Syracuse, in the county of Onondaga and State of New York, have invented certain new and useful Improvements in Vehicle Running-Gear, of which the following is a specification.

This invention relates to carriages and wagons, and has more especial reference to an improved running gear therefor.

The invention has for its principal object to provide running gear for vehicles, whereby, the vehicle will be enabled to turn during movement of the same, in limited or confined areas, thus, rendering the same useful for various purposes.

It is a more specific object of the invention to provide a vehicle, in which, both the forward and rear wheels of the same will be so connected as to render them dirigible.

Another object of the invention is to provide adjustable reach rods, the ends of which are connected to the forward and rear bolsters, to cause simultaneous movement of the wheels during steering of the same and permitting the frame to be varied in length to accommodate bodies of different size.

Another important feature of the invention resides in the provision of novel supporting means for pivotally engaging the several bolsters of the vehicle, the supporting means being resilient, thus, preventing distortion of the reach rods by reason of such strain as may be imparted thereto and permitting independent movement of the forward and rear wheels.

Other and further improvements and novel details in the construction and arrangement of parts will be appreciated from the description to follow, which, for a clear understanding of the invention should be considered in connection with the accompanying drawings, forming a part hereof and wherein the preferred embodiment of the invention is shown for the purpose of illustration.

In the drawings:

Figure 1 is a top plan of a vehicle with our improved running gear applied thereto;

Fig. 2 is a longitudinal section in elevation through the same; and

Fig. 3 is a detail in perspective of one of the reach rods supporting brackets.

Referring now more specifically to the several figures of the said drawings and wherein like reference characters designate corresponding parts, it is to be noted, that we have shown our improved vehicle running gear as applied to the ordinary form of commercial vehicle frame, the same comprising forward and rear bolsters 1 and 2, the said bolsters having secured thereto suitable axles, whereby, a plurality of wheels generally indicated by the numeral 3 may be arranged thereupon. To facilitate connection with suitable draft means, a draft connection 4 is engaged with the forward bolster 1. To permit movement of the forward and rear bolsters 1 and 2 with relation to the body of the wagon, not shown, the usual body supporting arms 5 are arranged upon each of the said bolsters and are pivotally connected thereto as at 6, the connection being preferably in form of a bolt passing vertically of the arms and bolsters.

In order that the forward and rear bolsters 1 and 2 may be connected to efficiently support the body thereupon and also to render each of the wheels of the vehicle dirigible, there is provided a plurality of diagonally disposed reach rods 7 and 8, the said rods being formed of pairs of sections, which sections have series of openings 9 formed therein and adapted for registration at times, whereby locking bolts 10 may be passed through the same and the reach rods securely maintained in their adjusted positions. Upon the opposite extremities of the reach bars 7 and 8, there is arranged substantially U-shaped supporting brackets 11, the said brackets being secured to their respective extremities of the reach bars through the medium of rivets or bolts 12. Vertically alined apertures 13 are formed within the outer extremities of the supporting brackets and are adapted to be alined, when it is desired to connect the reach rods to the forward and rear bolsters of the vehicle, with U-shaped brackets 14, the said brackets having also, vertically alined openings therein registerable with the similarly alined openings 13 in the brackets 11. As will be noted, the supporting brackets 11 are formed of one sheet of metal and it is our intention to form these brackets of resilient metal, whereby, the reach rods 7 and 8 when engaged with the forward and rear bolsters 1 and 2 will be yieldably or resiliently supported. To effect the connection between the reach rods 7 and 8 and the forward and rear bolsters 1 and 2, bolts 15 are passed through the alined openings formed in the brackets 11 and 14, whereupon, nuts 16 are turned into engagement with their threaded extremities. By so connecting and arranging the reach rods 7 and 8 with relation to the forward and rear bolsters 1 and 2, it will be understood that upon turning of the forward bolster 1, the rear bolster 2 will be caused to turn in an opposite direction, thus, permitting the same to follow up the forward bolster and as a consequence, allowing a complete turn of the vehicle to be made in the smallest possible space. Furthermore, the vehicle by reason of its all dirigible nature may be used to advantage in exceedingly confined or limited spaces and thus, is rendered desirable for farming and the like.

While we have herein illustrated and described with a considerable degree of particularity constructional details of the device embodying our invention, it is to be understood that the invention is not limited to the particular form and arrangements of the several parts which may be modified within a wide range without departing from the essence of the invention, the construction shown and the description based thereon being intended to be taken in an illustrative rather than a limiting sense.

We claim:

In a vehicle running gear, the combination with the forward and rear wheels and bolsters of a vehicle, of spaced U-shaped vertically disposed brackets on said bolsters, crossed adjustable reach bars, substantially U-shaped spring metal bracket members having inclined base portions and connected at their longest arms to the ends of the reach bars, the arms of said brackets and the bolster brackets being interengaged, and fastening bolts positioned therethrough.

In testimony whereof we affix our signatures hereto.

HERMAN SCOFIELD.
ERNEST N. DAWSON.